United States Patent [19]

Doshi et al.

[11] 4,341,689

[45] Jul. 27, 1982

[54] TWO COMPONENT POLYURETHANE COATING SYSTEM HAVING EXTENDED POT LIFE AND RAPID CURE

[75] Inventors: Jyotindra K. Doshi, Mt. Prospect; Scott A. Wallenberg, Villa Park, both of Ill.

[73] Assignee: DeSoto, Inc., Des Plaines, Ill.

[21] Appl. No.: 279,821

[22] Filed: Jul. 2, 1981

[51] Int. Cl.³ ............................................. C08G 18/18
[52] U.S. Cl. ................................... 523/211; 528/48; 528/49; 528/55; 524/871
[58] Field of Search ................ 260/37 N; 528/48, 49, 528/55

[56] References Cited

U.S. PATENT DOCUMENTS 3,808,162  4/1974  Allen et al. ............................ 528/49
4,251,427  2/1981  Recker et al. .................... 260/37 N Primary Examiner—Maurice J. Welsh
Attorney, Agent, or Firm—Dressler, Goldsmith, Shore, Sutker & Milnamow, Ltd.

[57] ABSTRACT

A two component polyurethane coating system is disclosed in which the pot life is extended while retaining rapid cure. The system employs a first component which is a solution of a soluble resin containing active hydrogen atoms capable of reacting with isocyanate functionality, and said first component has dispersed therein an amine catalyst for the reaction absorbed in a molecular sieve having a pore size large enough to absorb the amine catalyst. The molecular sieve minimizes the catalytic effect of the amine catalyst when the two components are mixed until after the absorption of atmospheric moisture forces the sieve to release the catalyst to speed the cure. The second component comprises a solution of an organic polyisocyanate, this solution containing an organotin accelerator which has been deactivated with acetic acid or formic acid which minimizes the accelerating effect of the accelerator when the two components are mixed until after vaporization of the acid frees the accelerator to speed the cure.

15 Claims, No Drawings

TWO COMPONENT POLYURETHANE COATING SYSTEM HAVING EXTENDED POT LIFE AND RAPID CURE

DESCRIPTION

1. Technical Field

This invention relates to two component polyurethane coating systems which cure rapidly, but possess extended pot life nonetheless.

2. Background Art

Two component polyurethane coating systems are known. When the two components are mixed together they provide a liquid mixture which reacts at room temperature to provide a composition which cures without baking to provide a hard and solvent-resistant coating. In order that the composition can harden sufficiently to protect itself in a short period of time after application of the coating, it is desired that the mixture be rapidly reactive. However, the more rapid the reaction which takes place in the mixture, the shorter the working time which is available after mixing is complete and before the mixture becomes too viscous for proper application. This invention is concerned with extending the application time, which is known as the pot life of the composition, while retaining a rapid cure after application.

Other characteristics of the coating are also important. The concern here is with high gloss paints, and it is desired to improve the optical properties of these paints and also to improve the impact resistance of the cured paint.

Disclosure of Invention

The conventional two component polyurethane coating system comprises a first component which is a solution of a soluble resin containing active hydrogen atoms capable of reacting with isocyanate functionality in inert organic solvent, and a second component in which an organic polyisocyanate is dissolved in inert organic solvent. Catalysts speeding the active hydrogen-isocyanate reaction are incorporated in one or both of the two separately stored components. Where pigmented coatings are desired, pigments are normally dispersed in the solution of resin containing active hydrogen atoms, this resin usually being an hydroxy-functional resin, especially a polyester resin. As is conventional, water is excluded or tied up since water is independently reactive with isocyanate functionality.

This invention modifies the normal pot life-curing rate balance in two different ways. While each expedient contributes its own advantage, the two expedients are preferably used together.

First, in this invention an amine catalyst is preabsorbed onto a molecular sieve having a sufficiently large pore size to physically absorb the amine. These sieves are well known and are readily available in commerce. The sieve-protected amine catalyst is dispersed in the solution of resin containing active hydrogen atoms. When the two components of the coating are mixed together, the amine catalyst is kept out of contact with the polyisocyanate and this slows the cure until the greater exposure to air which occurs after coating. Air contains moisture which is captured by the molecular seive, and these sieves are well known to have a greater affinity for water than amines, so the capture of water causes the sieve to release the amine which speeds the cure. Since little moisture is captured prior to coating, the amine catalyst functions slowly in the pot prior to coating to provide long pot life, and rapidly in the coating to provide rapid cure.

Since any amine can be used as a catalyst, the minimum pore size will vary with the amine catalyst which is selected. Since larger amines are preferred catalysts, larger pored sieves are preferred herein. However, the pore size needed to absorb any given size amine is itself known, so this aspect of the invention is itself conventional.

Second, in this invention an organotin accelerator compound which is preferably a dialkyl (desirably dibutyl) tin difatty acid salt (preferably the dilaurate as dibutyl tin dilaurate) is used to further speed the cure. Dibutyl tin diacetate will further illustrate the preferred accelerators which may be used, and tetrabutyl tin will illustrate other organotin accelerators. As is common, the accelerator may be dispersed in the polyisocyanate component. In this invention the tin accelerator is deactivated with acetic acid or, less desirably, with formic acid. Acetic acid is volatile, and with the great surface area provided by coating, removal of acetic acid by vaporization at room temperature is only rapid after coating. As the acetic acid is lost, the reaction rate increases. Formic acid works the same way, but it is irritating and is less preferred.

The combination of both expedients is particularly effective since the two work in concert with one another. The amine provides a rapid cure, especially in the presence of the tin accelerator when the acetic acid deactivator is removed. The result is a pot life which can be as great as about 8 hours. Combined with this long pot life is the capacity to air dry to a handleable coating in as little as about 15 to 20 minutes. This is a surprisingly long pot life for such a rapid cure.

The initially acidic medium provided by the acetic or formic acid is particularly beneficial since it retards the reaction of isocyanate groups at the surface with atmospheric moisture. It will be appreciated that the evaporating acid remains longest at the surface. At the same time, and as the concentration of acid in the interior of the coating decreases, the moisture which has not reacted at the surface is picked up by the molecular sieve, this action displacing amine catalyst to speed the reaction in the interior of the coating. Thus, surface reaction with water is minimized to reduce the formation of haze which impairs the appearance of gloss coatings. Also, reaction with water in the interior is minimized, and this improves the impact resistance of the cured coatings.

For the reasons just stated, and while each of the two expedients are helpful when used separately, they are of especial importance when used together with one another where they coact as explained.

The soluble resin containing active hydrogen atoms capable of reacting with isocyanate functionality are preferably hydroxy-functional resins, most preferably polyester resins, though hydroxy-functional copolymers, such as acrylic copolymers containing copolymerized hydroxy ethyl acrylate and allylic copolymers containing copolymerized allyl alcohol, are also useful.

The preferred polyester resins are made by polyesterifying polyhydric alcohols with polybasic carboxylic acids, as is well known. Excess hydroxy functionality is used in making the polyester. The acid functionality need not be entirely consumed. The molecular weight of the polyester should be low enough to retain the desired solvent solubility, and this is conventionally regulated by having an adequate excess of hydroxy functionality, or by using tri- or tetra-functional reactants, or by using a monofunctional chain terminator to terminate the growing polyester chain. The provision of hydroxy functional resins, including polyesters, for cure by the isocyanate groups of organic polyisocyanates is itself well known. These conventional soluble polyesters have an hydroxy equivalent weight of 300 to 500 and an acid value of less than 30. Suitable polyesters are illustrated by a polyester of trimethylol propane and phthalic anhydride having an average molecular weight of about 1000, an hydroxy equivalent weight of about 400 and an acid value between 5 and 15.

The organic polyisocyanates are also conventional, and any organic polyisocyanate may be used, though diisocyanates are preferred. Suitable polyisocyanates are illustrated by 2,4-toluene diisocyanate and the biuret derived from the reaction with water of hexamethylene diisocyanate (which is a triisocyanate). Isophorone diisocyanate and diphenyl methane diisocyanate will further illustrate useful polyisocyanates. The use of these materials is shown in the Examples.

Acetic acid is the deactivator of choice. Formic acid is more volatile and useful, but it is malodorous and irritating to the skin, so acetic acid is much preferred. Propionic acid vaporizes more slowly and thus remains in the final coating to retard the cure, so it is not useful herein.

The acetic acid preferably used herein is employed in an amount of from 4 to 100, preferably from 12 to 60 grams of acetic acid per gram of tin accelerator. The tin accelerator is usually supplied in solvent solution and these proportions ignore the organic solvent. When formic acid is used, a corresponding molar proportion thereof is used.

Pigmentation in this invention is conventional. It is normal to incorporate the pigments in with the polyester resin solution in order to avoid any prereaction with the polyisocyanate component. The usual pigments, such as titanium dioxide (rutile), are useful, and these can be used in a pigment to binder weight ratio in the range of from 2:1 to 1:6, more preferably in the range of from 1:1 to 1:3.

The solvent content will vary with the type of coating application which is intended. It is presently preferred to use spray application (air spray), so the viscosity is adjusted for this type of application.

Preparation of catalyst-molecular sieve intermediate 30 grams of diazo bicyclooctane catalyst are mixed with 170 grams of a molecular sieve constituted by a Zeolite having a pore size of 13X. Such a product is available from the Linde Division of Union Carbide Corporation under the designation 13X molecular sieve. Mixing is carried out in a dry pebble mill, this mill being protected from moisture using a nitrogen blanket. Mixing is slow for 30 minutes to allow heat to escape as the catalyst is physically absorbed into the sieve.

As a matter of interest, the designation 13X indicates a pore size of 13 angstrom units and the designation X identifies the type of sieve, though the selection of sieve type is not of great importance herein.

A 75% solids solution in 2-ethoxy ethanol acetate of polyester resin prepared by the polyesterification of trimethylol propane, phthalic anhydride and adipic acid to provide an hydroxy equivalent weight of 515 and an acid value of 10 (Multron R-221-75 from Mobay may be used) is then added to the absorbed catalyst previously described, the polyester solution being added in an amount of 185 grams together with 70 grams of 2-ethoxy ethanol acetate. The mixture is then ground overnight to a 7.5 Hegman grind rating.

587.5 grams of additional polyester resin 75% solution (same as above) are then mixed in to provide a mixture of hydroxy-functional polyester resin and absorbed catalyst in an inert solvent medium.

Preparation of paint formulation 400 grams of titanium dioxide rutile are added to a pebble mill together with 10 grams of the 13X molecular sieve noted above and the mill is operated to cause any moisture present to be absorbed by the sieve. 100 grams of another polyester resin made by the polyesterification of trimethylol propane and phthalic anhydride to provide an hydroxy equivalent weight of 155-190 and an acid value of 3 (65% solution in 2-ethoxy ethanol acetate (Desmophen 650A-65 may be used) together with 100 grams of 2-ethoxy ethanol acetate and 50 grams of methyl ethyl ketone. It is also appropriate to add 2 grams of a flow control agent (a fluorocarbon agent from Minnesota Mining FC-430 may be used as a 1% solution in methyl ethyl ketone). This mixture is then ground overnight to a 7.5 Hegman grind rating and dumped from the mill. To the product is added 88 grams of butyl acetate and 230 grams of the same hydroxy-functional polyester resin and the product is thoroughly mixed.

50 grams of the molecular sieve intermediate including hydroxy-functional polyester resin prepared previously and 120 grams of methyl ethyl ketone are added to the pigmented mix to provide the first component of the two component system. This first component can be described as a polyester-containing pigmented base.

Polyisocyanate component (activator portion)

The following are mixed together with slow agitation while excluding moisture:

| | grams |
|---|---|
| Biuret formed by reacting hexamethylene diisocyanate with water (75% solution in 2-ethoxy ethanol acetate (see note 1) | 493 |
| 2-ethoxy ethanol acetate | 170.6 |
| methyl ethyl ketone | 142 |
| 1% solution of dibutyl tin dilaurate in methyl ethyl ketone | 25 |
| glacial acetic acid | 8.8 |

Note 1 - Desmodur N-75 from Mobay may be used

Application

The polyester-containing pigmented base and the activator portion described above are mixed in equivolume proportions. The resulting mixture provides a liquid coating composition which can be applied to a substrate by air spray. This capacity for air spray application lasts about 6 hours which is a very satisfactory pot life. Upon spray application, the coating at a thickness of 1-1.8 mil (dry) becomes dry to the touch in 20 minutes and it becomes fully resistant to removal by adhesive tape in 45-60 minutes. After 2 hours the air dried coating resists removal by 100 double rubs with a methyl ethyl ketone-saturated cloth.

The resulting coating exhibits superior impact resistance and provides a gloss finish with improved optical appearance when compared with the two-component polyurethane coatings previously used.

What is claimed is:

1. A two component polyurethane coating system comprising a first component which is a solution of a soluble resin containing active hydrogen atoms capable of reacting with isocyanate functionality, said resin being dissolved in inert organic solvent, said first component having dispersed therein an amine catalyst for said reaction with isocyanate absorbed in a molecular sieve having a pore size large enough to absorb the amine catalyst, and a second component comprising an organic polyisocyanate in solution in inert organic solvent, whereby said molecular sieve will minimize the catalytic effect of said amine catalyst when the two components are mixed until after coating when absorption of atmospheric moisture by said molecular sieve will force release of said amine catalyst to speed the cure of the applied coating.

2. A two component system as recited in claim 1 in which said soluble resin is hydroxy functional.

3. A two component system as recited in claim 2 in which said hydroxy functional resin is a polyester resin.

4. A two component system as recited in claim 2 in which said molecular sieve is a zeolite salt.

5. A two component system as recited in claim 2 in which said amine catalyst is diazo bicyclooctane.

6. A two component system as recited in claim 1 in which said first component contains pigment providing a pigment to binder weight ratio of from 2:1 to 1:6.

7. A two component system as recited in claim 6 in which said pigment is titanium dioxide rutile.

8. A two component system as recited in claim 1 in which said polyisocyanate solution contains a dialkyl tin difatty acid salt accelerator for said reaction with isocyanate which has been deactivated with acetic acid.

9. A two component system as recited in claim 8 in which said soluble resin is an hydroxy functional polyester resin having an hydroxy equivalent weight of 300 to 500 and an acid value below 30, and said tin accelerator is dibutyl tin dilaurate.

10. A two component system as recited in claim 8 in which said first component contains titanium dioxide rutile pigment providing a pigment to binder weight ratio of from 1:1 to 1:3.

11. A two component polyurethane coating system comprising a first component which is a solution of a soluble resin containing active hydrogen atoms capable of reacting with isocyanate functionality, said resin being dissolved in inert organic solvent, and a second component comprising an organic polyisocyanate in solution in inert organic solvent, said polyisocyanate solution containing an organotin accelerator for said reaction with isocyanate which has been deactivated with acetic acid or formic acid, whereby said acid will minimize the accelerating effect of said tin accelerator when the two components are mixed until after coating when vaporization of said acid will free said tin accelerator to speed the cure of the applied coating.

12. A two component system as recited in claim 11 in which said soluble resin is an hydroxy functional polyester resin having an hydroxy equivalent weight of 300 to 500 and an acid value below 30.

13. A two component system as recited in claim 12 in which said accelerator is dibutyl tin dilaurate.

14. A two component system as recited in claim 12 in which said first component further includes an amine catalyst in said first component.

15. A two component system as recited in claim 14 in which said amine catalyst is absorbed on a molecular sieve.

* * * * *